United States Patent Office =

3,361,643
Patented Jan. 2, 1968

3,361,643
METHOD FOR CULTIVATING MICRO-ORGANISMS HAVING EXOENZYME-PRODUCING ABILITY
Danji Fukushima, Yono-shi, Kinji Uchida, Noda-shi, Kazuya Hayashi, Kashiwa-shi, and Atsushi Yasuda and Akira Arai, Noda-shi, Japan, assignors to Kikkoman Shoyu Co., Ltd., Noda-shi, Chiba-ken, Japan, a corporation of Japan
No Drawing. Filed Apr. 5, 1965, Ser. No. 445,731
Claims priority, application Japan, Apr. 15, 1964, 39/20,980
11 Claims. (Cl. 195—66)

ABSTRACT OF THE DISCLOSURE

A method for culturing micro-organisms having exoenzyme-producing ability in known culture media under known culturing conditions in which the desired exoenzymes are produced in the culture media at a remarkably improved high rate of activity, due to the addition to said culture media of phosphatidyl inositol containing phosphatidyl inositol at high purity and/or high concentration.

---

The present invention relates to a method for culturing micro-organisms having exoenzyme-producing ability by which, while using known culture media suitable for the micro-organisms employed under known culture conditions suitable for the said micro-organisms, the desired exoenzymes are produced in the culture media at remarkably improved, high rate of activity.

More particularly, the invention relates to a method of culturing micro-organisms having exoenzyme-producing ability, characterized in that the culturing is performed under addition of phosphatidyl inositol into the culture media.

In the past, in the field of enzyme production by means of culturing of micro-organisms, considerable efforts have been made, with the purpose of increasing the rate of production, to obtain or utilize enzymes with industrial advantage, including selection of composition of culture medium and search for effective additives for the culture medium, besides selection and improvement of the micro-organisms.

According to the present invention, the enzyme productivity of micro-organisms having exoenzyme-producing ability can be remarkably improved by performing the culturing under addition of phosphatidyl inositol, one of the phospholipides, to the culture medium.

Further, according to this invention, while the degree of improvement differs depending on the type of micro-organisms, the addition of phosphatidyl inositol is useful for improving the activity of the enzymes in the culture media broadly for micro-organisms having exoenzyme-producing ability, and thereby the production of exoenzymes can be performed highly advantageously with very simple means.

The invention is based inter alia on the observation that the sludge-like solid substance, which is precipitated when cooled from extraction liquid resulting from extractions of soybean or defatted soybean with hot ethanol, selectively contains phosphatidyl inositol at a very high content, and on the hitherto-unknown observation that the phospholipides in the said substance consist mostly of phosphatidyl inositol. This substance can be directly, or after further purification, utilized as the additive to the culture medium. By this discovery the use of phosphatidyl inositol obtained through complicated procedures from yeast or hexane-extracted crude soybean oil is made unnecessary, and the said additive for culture medium can be obtained with high industrial advantage and better effectiveness.

No appreciable improvement is recognized when a culture medium is caused to contain alkali-extraction liquid of soybean or soybean powder, unless phosphatidyl inositol is added to the culture medium in accordance with this invention. The reason therefor is not yet fully clear but, quite surprisingly, the fact is that the improvement in the enzyme activity in the culture medium is recognized only when phosphatidyl inositol is added to be co-present in the medium at a considerably high concentration and/or purity, and otherwise the function and effectiveness of this invention cannot be expected even if the culture medium originally contain phospholipides including phosphatidyl inositol.

Accordingly, one object of this invention is to provide a method for culturing micro-organisms having exoenzyme producing ability with remarkably improved exoenzyme production, by means of very simple procedure.

Other many objects and advantages of the present invention will become clear from reading the following disclosures.

Phosphatidyl inositol to be added to culture media in accordance with this invention is per se a known compound having the formula

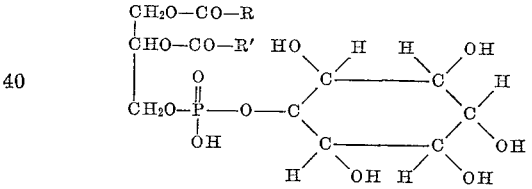

(wherein R and R' denote fatty acid residues).

Inositol which is one of the constituents of above phosphatidyl inositol or other phospholipides which resemble, and are normally co-present with, phosphatidyl inositol such as phosphatidyl choline and phosphatidyl ethanolamine, etc. have no appreciable effect to enhance the production if enzymes.

Many causes may be presumed to be responsible for the above effect of phosphatidyl inositol.

For example, phosphatidyl inositol may act as a growth-promoting factor of the micro-organisms; or may prevent autolysis of the micro-organisms; it may promote permeability of cell membrane of the enzymes; it may act as a production-promoting factor of the enzymes; or may assist stability of the enzymes; or plural causes as enumerated in the above may function concurrently. Just which of the above is the exact function or functions of phosphatidyl inositol is not yet fully clear. The effect of adding phosphatidyl inositol in accordance with this invention is not limited to specific enzymes or to particular micro-organisms, and this invention is rather generally applicable. Again the addition similarly shows excellent effect in culture media containing various components at various combinations (cf. Table 2), and therefore the applicability of this invention is of very broad range.

Accordingly, in the method of the present invention any culture medium, which is suitable for the type of micro-organisms employed, can be used under culture conditions also suited for the micro-organisms, and it is unnecessary to particularly alter these conditions because of the addition of phosphatidyl inositol.

The micro-organisms which are involved in this invention may be any so far as they possess exoenzyme-producing ability, and generally such micro-organisms as bacteria, Actinomycetes, yeasts and fungi can be used.

As such micro-organisms, for example, the following may be named.

BACTERIA

*Bacillus subtilis*, *Bacillus mesentericus*, *Bacillus cereus*, *Bacillus megaterium*, *Pseudomonas fluorescens*, *Pseudomonas aeruginosa*, *Pseudomonas desmolitica*, *Serratia marcescens*, *Clostridium felsineum*, *Clostridium acetobutylicum*, *Leuconostoc mesenteroides* and *Lactobacillus sake*.

ACTINOMYCETES

*Streptomyces griseus*, *Streptomyces scabies*, *Streptomyces verne*, *Streptomyces halstedii*, *Streptomyces coelicolor*, *Streptomyces albus*, *Streptomyces alboflavus* and *Streptomyces abikoensis*.

YEASTS

*Saccharomyces cerevisiae*, *Torula utilis* and *Candida lipolytica*.

FUNGI

*Rhizopus javanicus*, *Rhizopus oryzae*, *Rhizopus japonicus*, *Rhizopus chinensis*, *Rhizopus reflexus*, *Rhizopus delemar*, *Rhizopus nigricans*, *Rhizopus niveus*, *Rhizopus arrhizus*, *Rhizopus achlamydosporus*, *Rhizopus formosaensis*, *Aspergillus oryzae*, *Aspergillus sojae*, *Aspergillus inuii*, *Aspergillus aureus*, *Aspergillus saitoi*, *Aspergillus awamori*, *Mucor javanicus*, *Mucor praini*, *Penicillium chrysogenum*, *Penicillium notatum*, *Absidia glauca*, *Fusarium solani* and *Sclerotinia libertiana*.

Among these micro-organisms having productive ability of at least one of protease, lapase and amylase, *Bacillus subtilis*, *Bacillus cereus*, *Bacillus mesentericus*, *Streptomyces griseus*, *Streptomyces scabies*, *Streptomyces abikoensis*, *Streptomyces albus*, *Aspergillus oryzae*, *Aspergillus sojae*, *Aspergillus ochraceus*, *Aspergillus melleus*, *Aspergillus saitoi* and *Aspergillus awamori* are micro-organisms having proteolytic enzyme-producing ability to which the present invention can be preferably applied. *Candida lipolytica*, *Mucor javanicus*, *Rhizopus delemar*, *Rhizopus javanicus*, *Aspergillus awamori* and *Aspergillus aureus* are micro-organisms having lipolytic enzyme-producing ability to which this invention is also preferably applied. Again, *Rhizopus javanicus*, *Aspergillus oryzae*, *Aspergillus sojae*, *Bacillus subtilis* and *Bacillus mesentericus* are microorganisms having amylolytic enzyme-producing ability to which this invention can be preferably applied.

The phosphatidyl inositol to be added to culture media for practicing the present invention is a compound as represented by the formula given in the above. In accordance with this invention, it is not necessarily required to use the isolated compound per se so far as its activity to increase the enzyme production is not impaired, but substances containing phosphatidyl inositol at high purity and/or high concentration may be used. In that case, of course the higher the purity and/or concentration of phosphatidyl inositol in the substance, the better. Such phosphatidyl inositol-containing substance is particularly preferred as the additive in this invention, which can be, as described later in detail, obtained by extracting soybean with hot ethanol and separating from the extraction liquid the solid component precipitated when cooled. The resulting precipitate contains a considerable amount of saccharides, for example, sucrose, raffinose, stachyose, but, as phosphatide, substantially phosphatidyl inositol alone. It is to be understood that the high purity as referred to in this invention denotes inclusively such case. The phospholipides in such a substance contain phosphatidyl inositol selectively at a high purity.

Accordingly, the addition of phosphatidyl inositol referred to in this invention should be understood to include, not only that of the pure substance as represented by the formula given in the above, but also that of phosphatidyl inositol-containing substances described in the above.

In the present invention, the amount of phosphatidyl inositol to be added to the culture medium differs depending on the type of microorganism cultured and method of culture. Generally speaking, however, in case of a culture by the koji method, suitably it is no less than 0.5% by weight of the culture medium as pure phosphatidyl inositol, and in case of a culture in liquid medium, it is no less than 0.05% by weight, preferably no less than 0.1% by weight of the culture medium. Some of the micro-organisms show increased enzyme-productivity with increased amount of addition, but some show decreased rate of rise in enzyme-productivity at a phosphatidyl inositol concentration above the optimum value (cf. Tables 3 and 8). Therefore the amount of addition should be suitably selected according to the method of culture and the type of micro-organism employed. Needless to say, it is unnecessary to use a great amount of the additive when the result does not justify such. In case of culture in liquid medium, normally it is sufficient to add the additive, in terms of pure phosphatidyl inositol, in an amount no less than 0.05 wt. percent, preferably about 0.1 wt. percent–1 wt. percent, to the culure medium.

The method of this invention is applied to culture in liquid medium with greater advantage.

Depending on the type of micro-organisms, the addition of phosphatidyl inositol to culture medium in accordance with this invention may be effected not only before the inoculation but at or after the growing of the micro-organisms, or the additive may be added to the medium of second culture of the resting cell. When micro-organisms having productive ability of more than two kinds of exoenzymes are cultured in accordance with this invention, the activities of all kinds of exoenzymes may increase, or in certain cases the activities of not all kinds may increase. This invention is particularly advantageous for increasing proteolytic and lipolytic enzymes-producing ability.

According to the present invention, it is possible to produce exoenzymes in culture media at high activity. The culture media may be utilized, after completion of the culturing, as they are, or as suitably condensed, or the enzymes may be separated from the culture media.

While there is a variety of methods for obtaining phosphatidyl inositol-containing substances, only a few of them will be explained hereinbelow for examples.

(1) When yeast is the starting material:

Dry yeast is extracted with chloroform-methanol mixture (2:1), and methanol is added to the extracted solution to make the chloroform-methanol ratio 1:2. The resulting precipitate is collected and dissolved in chloroform, to which half the volume of the solution of methanol is added and the resulting precipitate is filtered off. To the filtrate, methanol is added to make the chloroform-methanol ratio 1:2 and the resulting precipitate is recovered to provide phosphatidyl inositol of relatively high purity. In order to still improve the purity, the first extracted solution may be subjected to dialysis by Folch's method to be freed of its water-soluble components, and thereafter the procedures of dissolving the precipitate in chloroform and adding methanol thereto to cause precipitation of solid may be repeated.

(2) When hexane-extracted crude soybean oil is the starting material:

To crude soybean oil, about 5% of hot water is added and stirred, and the precipitate formed is collected and dried (crude lecithin). The extraction residue thereof with hot ethanol is further extracted with chloroform, and to the extracted solution, twice its volume of methanol is added and the resulting precipitate is collected. Thereafter the dissolving of the precipitate in chloroform and precipitation of solid therefrom by addition of methanol may be repeated if necessary, and finally the precipitate is dissolved in chloroform, half the volume of the solution of methanol is added thereto, the resulting precipitate is removed, followed by further addition of methanol to the filtrate to make the chloroform-methanol ratio 1:2, and the resulting precipitate is recovered.

(3) When soybean is the starting material:

Furthermore, in the method of this invention, the substance other than oil, which is obtained by extracting soybean with hot ethanol and cooling the extraction solution, or the purified product thereof may be used. Up to the present, it has been entirely unknown that the phospholipides in such a substance consist mostly of phosphatidyl inositol. As the material of the substance described above, the soybean may be in its natural form, or in any optional form as defatted soybean, soybean flour and soybean meal. The procedures will be described in detail hereinbelow.

Soybean flakes are extracted with high concentration ethanol, such as of 92 vol. percent at high temperature, for example, around boiling point, or under elevated pressures, and the extraction liquid is cooled to, for example, room temperature so that the solid phase precipitated when cooled may be separated by means of, for example, centrifuge. From this precipitate ethanol is removed and if necessary, water is also removed by means of anhydrous polar organic solvent such as anhydrous ethanol or anhydrous acetone. Thus obtained powder may be used as it is. Again, the above precipitate separated may be purified by extraction with a mixed solvent composed of 2 parts of chloroform and 1 part of ethanol, followed by dialysis of the extraction liquid by Folch's method, pouring the product into 10 times its volume of a methyl acetate solution under violent stirring, collection of the resultant precipitate and drying thereof.

In the following, the cases of culturing various microorganisms belonging to bacteria, Actinomycetes, yeasts and fungi with the addition of phosphatidyl inositol to the culture media in accordance with this invention will be explained by means of examples in contrast to controls wherein the addition of phosphatidyl inositol was omitted. In these examples, as the phosphatidyl inositol, substances having about 80% of phosphatidyl inositol content were used, unless otherwise indicated. The isolation and determination of phosphatidyl inositol were done by means of chromatography using DEAE-cellulose and silica gel (cf. Journal of American Oil Chemists' Society, vol. 40, pp. 425–454). Further, the fact that the effect of adding the above substances to the culture media is purely attributable to phosphatidyl inositol and to no other impurities which are co-present was established by the use of pure compound refined by means of above chromatography (cf. Table 1). The measurement of enzyme activity was performed as follows. To wit, in case of a culture in the liquid medium, the cultured broth from which the micro-organisms were removed was used as the enzyme solution and in case of a culture by the koji method, the extracted solution of the culture with 10 times its volume of water was used as the enzyme solution, which was suitably diluted and the enzyme activities were measured by the following methods.

Method for measuring proteolytic enzyme activity:

One millilitre of an enzyme solution was mixed with 1 ml. of 2% milk casein solution containing 0.2 mol buffer solution of pH 7.0, and the mixture was incubated for 60 minutes at 35° C., followed by addition thereto of 4 ml. of 5% trichloroacetic acid to remove the protein not yet decomposed. To 1 ml. of the filtrate then 5 ml. of 0.4 mol sodium carbonate and 1 ml. of Folin's reagent were added, and its optical density (660 m$\mu$) minus that of the blank measured with photoelectrophotometer was shown as the proteolytic enzyme activity. The values of activities in the tables below show that of one ml. of culture filtrates.

Method for measuring lipolytic enzyme activity:

To 1 millilitre of a non-diluted enzyme solution, 5 ml. of a homogenized mixture of 3 parts of 2% polyvinyl alcohol with 1 part of olive oil, homogenized by means of a mixer, and 4 ml. of a 0.2 mol buffer solution of pH 5.0 were added. The resultant mixture was then incubated for 60 minutes at 37° C., and the reaction was stopped by the addition of 20 ml. of an alcohol acetone mixture (1:1). The reaction mixture was titrated with N/20-NaOH, and the so-obtained titration value minus that of the blank was shown as the lipolytic enzyme activity.

Method for measuring amylolytic enzyme activity:

To 10 millilitre of an enzyme solution and 5 ml. of 0.2 mol buffer solution of pH 4.8, 20 ml. of 2% soluble starch solution was added, and the mixture was incubated for 30 minutes at 40° C. The reducing power of the reaction mixture was determined by Fehling-Lehmann-Schoorl's method and shown as "Saccharifying power." In the course of the enzyme reaction 0.5 ml. of the above reaction mixture was mixed with 5 ml. of iodine and potassium iodide solution, and the incubation time required for the mixture to show the same degree of color to standard color of cobalt chloride solution (red) was measured. One unit of the "liquefying power" is 10,000 times the reciprocal of the time so measured by minute.

*Example 1*

Eighty (80) ml. each of culture media A and B having the following compositions were put in shaking flasks and after sterilization, the below-specified Actinomycetes were each inoculated therein, and cultured with shaking at 30° C., with the view to compare the proteolytic enzyme activity at pH 7.0 obtained in case phosphatidyl inositol (hereinafter abbreviated as PI) was added to the culture media in accordance with this invention, with that obtained in case of controls wherein no phosphatidyl inositol was added. The results are shown in the following Tables 1 through 3.

Culture medium A:

| | |
|---|---|
| Glucose, percent | 1.0 |
| Meat extract, percent | 0.5 |
| Polypepton, percent | 0.5 |
| NaCl, percent | 0.5 |
| pH | 6.0 |

Culture medium B:

| | |
|---|---|
| Glucose, percent | 4.0 |
| Saccharose, percent | 0.4 |
| KCP [1], percent | 1.6 |
| Yeast extract, percent | 0.2 |
| Meat extract, percent | 0.15 |
| $NH_4Cl$, percent | 0.25 |
| NaCl, percent | 0.25 |
| $KH_2PO_4$, percent | 0.05 |
| Polyphosphate, percent | 0.02 |
| KOH, percent | 0.03 |
| $FeSO_4$, percent | 0.0004 |
| $ZnSO_4$, percent | 0.0004 |
| $CaCO_3$, percent | 0.20 |
| pH | 6.0 |

[1] Soybean protein product refined by extracting defatted soybean flour with methanol.

TABLE I

| Microorganism | Culture medium | Amount of PI added (final concentration, percent) | Culture time (day) | | | | | |
|---|---|---|---|---|---|---|---|---|
| | | | 2 | 3 | 4 | 5 | 7 | 9 |
| Streptomyces scabies | A | 0 | 0.12 | 0.57 | 0.54 | 0.30 | 0.27 | 0.24 |
| | | 0.2 | 0.03 | 1.23 | 1.50 | 0.93 | 0.66 | 0.78 |
| | | *0.2 | 0.03 | 1.29 | 1.65 | 0.99 | 0.63 | 0.84 |
| Streptomyces griseus | A | 0 | 0.06 | 0.09 | 0.27 | 0.24 | 0.27 | 0.27 |
| | | 0.2 | 0.00 | 0.00 | 0.63 | 0.75 | 0.69 | 0.60 |

NOTES.—1. The purity of the phosphatidyl inositol marked with * was 100%. 2. The values show proteolytic enzyme activity.

TABLE 2

| Microorganism | Culture medium | Amount of PI added (final concentration, percent) | Proteolytic enzyme activity | Activity improvement (times) |
|---|---|---|---|---|
| Streptomyces scabies | A | 0 | 0.15 | |
| | | 0.06 | 0.72 | 4.8 |
| | B | 0 | 2.4 | |
| | | 0.06 | 12.4 | 5.1 |
| Streptomyces griseus | A | 0 | 0.012 | |
| | | 0.06 | 0.51 | 42.5 |
| | B | 0 | 0.24 | |
| | | 0.06 | 0.78 | 3.3 |
| Streptomyces abikoensis | A | 0 | 0.66 | |
| | | 0.16 | 1.08 | 1.6 |
| | B | 0 | 1.50 | |
| | | 0.16 | 5.25 | 3.5 |
| Streptomcyes albus | A | 0 | 0.24 | |
| | | 0.06 | 0.45 | 1.9 |
| Streptomyces alboflavus | A | 0 | 0.03 | |
| | | 0.06 | 0.75 | 25.0 |

NOTE.—The enzyme activity was measured after six days of culture.

TABLE 3

| Micro-organism | Amount of PI added (final concentration, percent) | | | | | | |
|---|---|---|---|---|---|---|---|
| | 0 | 0.03 | 0.05 | 0.10 | 0.20 | 0.30 | 0.50 |
| Streptomyces albus | 0.30 | 0.33 | 0.45 | 0.45 | 0.81 | 1.32 | 2.07 |
| Streptomyces scabies | 0.18 | 0.21 | 0.45 | 0.90 | 1.05 | 1.32 | 2.34 |
| Streptomyces griseus | 0.15 | 0.24 | 0.51 | 0.60 | 0.69 | 0.78 | 0.90 |

NOTE.—1. The values show proteolytic enzyme activity. 2. The enzyme activity was measured after six days of culture.

Example 2

Ten (10) ml. each of culture media C and D having the following compositions were put in test tubes and sterilized. Thereafter each micro-organism was inoculated thereinto and cultured with shaking at 30° C. to examine the effect of phosphatidyl inositol addition on production of proteolytic enzyme. The results are shown in Tables 4 and 5. The proteolytic enzyme activity was measured at pH 7.0.

Culture medium C:
  Meat extract, percent _____ 1.0
  Polypepton, percent _____ 1.0
  NaCl, percent _____ 0.5
  Glucose, percent _____ 1.0
  pH _____ 7.0

Culture medium D:
  Alkali-extracted solution of soybean (20 times vol.wt.).
  pH _____ 7.0

TABLE 4

| Micro-organism | Amount of PI added (final concentration, percent) | Culture time (day) | | | |
|---|---|---|---|---|---|
| | | 1 | 2 | 3 | 4 |
| Bacillus subtilis | 0 | 0.4 | 1.2 | 1.8 | 2.7 |
| | 0.1 | 1.3 | 2.1 | 3.5 | 4.8 |
| Bacillus subtilis var. niger | 0 | 6.0 | 6.0 | 8.5 | 11.0 |
| | 0.1 | 3.5 | 10.5 | 14.0 | 18.5 |

NOTES.—1. Culture medium=C. 2. The values show proteolytic enzyme activity.

TABLE 5

| Micro-organism | Culture medium | Amount of PI added (final concentration, percent) | Proteolytic enzyme activity | Activity improvement (times) |
|---|---|---|---|---|
| Bacillus cereus | C | 0 | 0.10 | |
| | | 0.1 | 0.15 | 1.5 |
| Bacillus subtilis var. niger | D | 0 | 0.9 | |
| | | 0.16 | 4.2 | 4.7 |
| Bacillus megaterium | D | 0 | 0.15 | |
| | | 0.16 | 0.20 | 1.3 |
| Bacillus filmus | D | 0 | 0.30 | |
| | | 0.16 | 0.40 | 1.3 |

NOTE.—Culture time=5 days.

Example 3

Culture media E, F and G each having the following composition were each placed in a Fernback's flask in case it was a culture by the koji method, or in a shaking flask in case it was a culture in liquid medium, and was sterilized. Thereafter, yellow Aspergilli or black Aspergilli were inoculated thereinto, and standing culture (culture by the koji method) or shaking culture (culture in the liquid medium) was performed for 4 days at 30° C. The proteolytic enzyme activity values measured thereafter are shown in Table 6 below.

Culture medium E:
    Defatted soybean meal _____ g__ 0.5
    Wheat bran _____ g__ 2.0
    Water _____ ml_ 100

Culture medium F:
    Defatted soybean meal _____ g__ 10
    Wheat bran _____ g__ 10
    Water _____ ml_ 18

Culture medium G:
    Wheat bran _____ g__ 20
    Water _____ cc_ 14

TABLE 7

| | Amount of PI added, percent | |
|---|---|---|
| | 0 | 0.1 |
| Liquefying power | 71 | 295 |
| Saccharifying power | 8 | 18 |

NOTE.—The amylolytic enzyme activity was measured at pH 4.8.

Example 5

Culture media H through K each having the following composition were used, and in which the below-specified micro-organisms were cultured for 4 days at 30° C. with shaking to test the effect of phosphatidyl inositol addition on production of lipolytic enzymes. The results are shown in Tables 8 and 9 below.

Culture medium H:
    Pepton, percent _____ 10
    Glucose, percent _____ 2
    $MgSO_4$, percent _____ 0.05
    $NaNO_3$, percent _____ 0.1
    $KH_2PO_4$, percent _____ 0.1
    pH _____ 6.0

TABLE 6

| Micro-organism | Method of cultivation | Culture medium | Amount of PI added (final concentration, percent) | Proteolytic enzyme activity | Activity improvement (times) |
|---|---|---|---|---|---|
| Aspergillus oryzae | Shaking culture in the liquid medium. | E | 0 | 7.0 | |
| | | | 0.02 | 9.6 | 1.4 |
| Aspergillus sojae | Standing culture by the koji method. | F | 0 | 2.3 | |
| | | | 0.7 | 2.8 | 1.2 |
| Aspergillus awamori | Standing culture by the koji method. | G | 0 | 1.35 | |
| | | | 2.0 | 1.75 | 1.3 |

NOTE.—The proteolytic enzyme activity was measured at pH 2.7 in case of Aspergillus awamori, and in other cases, at pH 7.0.

Example 4

Rhizopus javanicus was cultured by shaking culture for 4 days at 30° C., using a culture medium having the following composition, to test the effect of phosphatidyl inositol addition on production of amylolytic enzymes. The results are shown in Table 7 below.

Composition of culture medium:
    Wheat bran _____ g__ 3
    Soluble starch _____ g__ 1
    Rice bran _____ g__ 0.5
    $NaNO_3$ _____ g__ 0.2
    Water _____ ml_ 100
    pH _____ 5.0

Culture medium I:     Percent
    Pepton _____ 2
    Dextrin _____ 4
    $(NH_4)_2SO_4$ _____ 1
    $CaCO_3$ _____ 1.5
    Olive oil _____ 0.5

Culture medium J:
    Corn steep liquor, percent _____ 3
    Dextrin, percent _____ 4
    $(NH_4)_2SO_4$, percent _____ 1
    pH _____ 6.0

Culture medium K:
    Polypepton, percent _____ 0.3
    Meat extract, percent _____ 0.5
    $KH_2PO_4$, mol _____ 0.05
    pH _____ 7.0

TABLE 8

| Micro-organism | Culture medium | Amount of PI added (final concentration, percent) | | | | | |
|---|---|---|---|---|---|---|---|
| | | 0 | 0.04 | 0.12 | 0.20 | 0.28 | 0.40 |
| Rhizopus javanicus | H | 2.8 | 3.4 | 5.1 | 6.3 | 6.3 | |
| Aspergillus awamori | H | 2.1 | 4.2 | 5.4 | 6.1 | 6.2 | |
| Asperigillus inuii | H | 2.0 | 3.2 | 3.1 | | | |
| Adpergillus aureus | H | 1.2 | 1.5 | 2.5 | | | |
| Rhizopus delemar | I | 4.2 | | | 10.8 | | 14.4 |
| Rhizopus javanicus | I | 5.3 | | | 6.9 | | 11.5 |
| Rhizopus formosaensis | I | 4.8 | | | 10.8 | | 13.4 |
| Rhizopus niveus | I | 1.0 | | | 10.7 | | 12.5 |

NOTE.—The values show lipolytic enzyme activity.

TABLE 9

| Micro-organism | Culture medium | Control | This invention |
|---|---|---|---|
| Mucor javanicus | J | 6.5 | 13.1 |
| Ccor upraini | J | 3.8 | 5.9 |
| Mandida lipolytica | J | 8.3 | 15.3 |
| Psudomonas fluorescens | K | 2.3 | 4.8 |

NOTES.—1. In controls, no phosphatidyl inositol was added, while in the examples of this invention, 0.15% of phosphatidyl inositol was added.
2. The values show lipolytic enzyme activity.

We claim:

1. In a method of culturing micro-organisms having exoenzyme-producing ability in a nutrient medium, the improvement according to which the culturing is carried out in the presence, in the culture medium, of at least about .05% by weight, based on the culture medium, of phosphatidyl inositol, substantially free of other phosphatides, thereby increasing the yield or activity of enzymes within the medium.

2. In a method of culturing micro-organisms having exoenzyme-producing ability in a nutrient medium in the liquid phase, the improvement according to which the culturing is carried out in the presence, in the liquid phase culture medium, of at least about 0.05% by weight, based on the culture medium, of phosphatidyl inositol, substantially free of other phosphatides, thereby increasing the yield or activity of enzymes within the medium.

3. In a method of culturing micro-organisms having exoenzyme-producing ability in a nutrient medium in the liquid phase, the improvement according to which the culturing is carried out in the presence, in the liquid phase culture medium, of at least about 0.1% by weight, based on the culture medium, of phosphatidyl inositol, substantially free of other phosphatides, thereby increasing the yield or activity of enzymes within the medium.

4. In a method of culturing micro-organisms having exoenzyme-producing ability in a nutrient medium by the Koji method, the improvement according to which the culturing is carried out in the presence, in the culture medium, of at least about 0.5% by weight, based on the culture medium, of phosphatidyl inositol, substantially free of other phosphatides, thereby increasing the yield or activity of enzymes within the medium.

5. In a method of culturing micro-organisms having exoenzyme-producing ability in a nutrient medium, the improvement according to which the culturing is carried out in the presence, in the culture medium, of phosphatidyl inositol, substantially free of other phosphatides, obtained from the solid component precipitated, upon cooling, from an extract of soybean with hot ethanol, thereby increasing the yield or activity of enzymes within the medium.

6. The improvement according to claim 1, wherein micro-organisms possess proteolytic enzyme-producing ability.

7. The improvement according to claim 6, wherein the micro-organisms are selected from the group consisting of Bacillus subtilis, Bacillus cereus, Bacillus mesentericus, Streptomyces griseus, Streptomyces scabies, Streptomyces abikoensis, Streptomyces albus, Aspergillus oryzae, Aspergillus ochraceus, Aspergillus melleus, Aspergillus saitoi and Aspergillus awamori.

8. The improvement according to claim 1, wherein micro-organisms possess lipolytic enzyme-producing ability.

9. The improvement according to claim 8, wherein the micro-organisms are selected from the group consisting of Candida liplytica, Mucor javaicus, Rhizopus delemar, Rhizopus javanicus, Aspergillus awamori and Aspergillus aureus.

10. The improvement according to claim 1, wherein micro-organisms possess amylolytic enzyme-producing ability.

11. The improvement according to claim 10, wherein the micro-organisms are selected from the group consisting of Rhizopus javanicus, Aspergillus oryzae, Aspergillus sojae, Bacillus subtilis and Bacillus mesentericus.

References Cited
UNITED STATES PATENTS 2,888,385   5/1959   Grandel _____ 195—67
3,186,919   6/1965   Rupe _____ 195—66

OTHER REFERENCES

Dawson, R. M. C.: Biochemical Journal 70, 559 to 570, December 1958.

LIONEL M. SHAPIRO, Primary Examiner.

A. LOUIS MONACELL, Examiner.